US011196671B2

(12) United States Patent
Baveja et al.

(10) Patent No.: US 11,196,671 B2
(45) Date of Patent: Dec. 7, 2021

(54) LAYER 2 CHANNEL SELECTION

(71) Applicant: CISCO TECHNOLOGY, INC., San Jose, CA (US)

(72) Inventors: Avni Baveja, San Jose, CA (US); Samar Sharma, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 414 days.

(21) Appl. No.: 15/336,524

(22) Filed: Oct. 27, 2016

(65) Prior Publication Data

US 2017/0118116 A1    Apr. 27, 2017

Related U.S. Application Data

(60) Provisional application No. 62/246,978, filed on Oct. 27, 2015, provisional application No. 62/247,017, filed on Oct. 27, 2015, provisional application No. 62/247,058, filed on Oct. 27, 2015, provisional application No. 62/247,103, filed on Oct. 27, 2015.

(51) Int. Cl.

| | |
|---|---|
| *H04L 12/741* | (2013.01) |
| *H04L 12/743* | (2013.01) |
| *H04W 72/04* | (2009.01) |
| *H04L 29/06* | (2006.01) |
| *H04L 29/08* | (2006.01) |
| *H04L 12/803* | (2013.01) |
| *H04L 12/947* | (2013.01) |

(52) U.S. Cl.
CPC ........ *H04L 45/745* (2013.01); *H04L 45/7457* (2013.01); *H04L 69/22* (2013.01); *H04L 69/324* (2013.01); *H04W 72/04* (2013.01); *H04L 47/125* (2013.01); *H04L 49/25* (2013.01)

(58) Field of Classification Search
None
See application file for complete search history.

(56) References Cited

U.S. PATENT DOCUMENTS

| | | | |
|---|---|---|---|
| 6,389,035 B1* | 5/2002 | Bertagna | H04L 47/10 370/236 |
| 6,683,869 B1 | 1/2004 | Pierson, Jr. | |
| 7,657,703 B1* | 2/2010 | Singh | H04L 45/00 711/108 |
| 8,248,928 B1* | 8/2012 | Wang | H04L 43/026 370/230 |
| 9,853,903 B1* | 12/2017 | Sharma | H04L 47/21 |
| 10,009,217 B2 | 6/2018 | Sharma et al. | |
| 2001/0030942 A1 | 10/2001 | Suzuki | |
| 2003/0002438 A1* | 1/2003 | Yazaki | H04L 29/06 370/229 |

(Continued)

*Primary Examiner* — Jeffrey M Rutkowski
*Assistant Examiner* — Ning Li
(74) *Attorney, Agent, or Firm* — Polsinelli PC

(57) ABSTRACT

In an example, there is disclosed a network switch or other computing apparatus comprising: an ingress interface; a plurality of egress interfaces; and one or more logic elements, including at least a content addressable memory (CAM), comprising a channel selection engine to provide persistent channel selection comprising: receive a packet on the ingress interface; inspect a layer 2 (L2) attribute of the packet; lookup the L2 attribute in the CAM; and assign the packet to an egress interface communicatively coupled to a network service.

21 Claims, 9 Drawing Sheets

(56) References Cited

U.S. PATENT DOCUMENTS

| | | | |
|---|---|---|---|
| 2003/0012139 A1* | 1/2003 | Fukumoto | H04L 29/06 370/235 |
| 2003/0043802 A1* | 3/2003 | Yazaki | H04L 29/06 370/389 |
| 2004/0090966 A1* | 5/2004 | Thomas | H04L 67/1008 370/395.52 |
| 2004/0100950 A1* | 5/2004 | Basu | H04L 45/00 370/389 |
| 2004/0128434 A1* | 7/2004 | Khanna | G11C 15/00 711/108 |
| 2006/0018142 A1* | 1/2006 | Srinivasan | G11C 15/00 365/49.16 |
| 2009/0249469 A1* | 10/2009 | Ishikawa | H04L 47/10 726/13 |
| 2009/0259810 A1* | 10/2009 | Baden | H04L 45/00 711/108 |
| 2011/0307656 A1* | 12/2011 | Hamdi | H04L 45/54 711/108 |
| 2012/0210142 A1* | 8/2012 | Ichiki | G06F 1/3209 713/300 |
| 2012/0250682 A1* | 10/2012 | Vincent | H04L 12/4633 370/390 |
| 2013/0258838 A1* | 10/2013 | Colven | H04L 49/552 370/218 |
| 2013/0305341 A1* | 11/2013 | Baker | H04L 41/0809 726/11 |
| 2013/0329547 A1 | 12/2013 | Takase et al. | |
| 2013/0347103 A1* | 12/2013 | Veteikis | H04L 43/04 726/22 |
| 2014/0010085 A1* | 1/2014 | Kavunder | H04W 28/0215 370/235 |
| 2014/0086249 A1* | 3/2014 | Assarpour | H04L 45/7457 370/392 |
| 2014/0153571 A1* | 6/2014 | Neugebauer | H04L 45/7457 370/392 |
| 2014/0195695 A1* | 7/2014 | Okita | H04L 47/125 709/239 |
| 2014/0321462 A1* | 10/2014 | Kancherla | H04L 45/72 370/389 |
| 2015/0195387 A1* | 7/2015 | Snyder, II | H04L 45/7457 370/392 |
| 2015/0207735 A1* | 7/2015 | Kuramoto | H04L 45/742 370/392 |
| 2015/0207905 A1* | 7/2015 | Merchant | H04L 69/22 370/390 |
| 2016/0050150 A1* | 2/2016 | Venkatesan | H04L 49/25 370/236 |
| 2016/0173379 A1* | 6/2016 | Heo | H04L 45/742 370/392 |
| 2017/0034056 A1* | 2/2017 | Mukherjee | H04L 49/25 |
| 2017/0063689 A1* | 3/2017 | Qin | H04L 45/38 |
| 2017/0308828 A1* | 10/2017 | Viquez Calderon | G06F 9/38 |

* cited by examiner

LAYER 2 CHANNEL SELECTION

Cross-Reference to Related Applications

This application claims priority to U.S. Provisional Application Ser. No. 62/246,978, filed Oct. 27, 2015, titled "High-Speed L2 Channel Selection," which is incorporated herein by reference. This application also claims priority to and incorporates by reference U.S. Provisional Application Ser. No. 62/247,017, titled "Traffic Distribution for L2 Channel Selection," 62/247,058, titled "Fault Tolerant L2 Channel Selection," and 62/247,103, titled "Hashing and Weighting of L2 Channel Selection," all filed Oct. 27, 2015.

FIELD OF THE SPECIFICATION

This disclosure relates in general to the field of computer networking, and more particularly, though not exclusively to, a system and method for providing a smart channel.

BACKGROUND

Certain network switches are equipped with "port channel" capabilities, such as those described in IEEE standard 802.3ad. In an example, a network switch may use port channels to load balance packets to service appliances, via an algorithm such as hardware hashing. For example, the layer 2 (MAC) address of an incoming packet may be hashed with an algorithm such as MODULO, where the MODULO value is selected as the number of physical ports in a logical port bundle. Thus, where 4 ports are supported, for example, incoming L2 addresses may be hashed with MODULO 4, and each packet is then assigned to a port in the logical port bundle. Network appliances may be attached to each physical port, providing duplicate functionality.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1A:
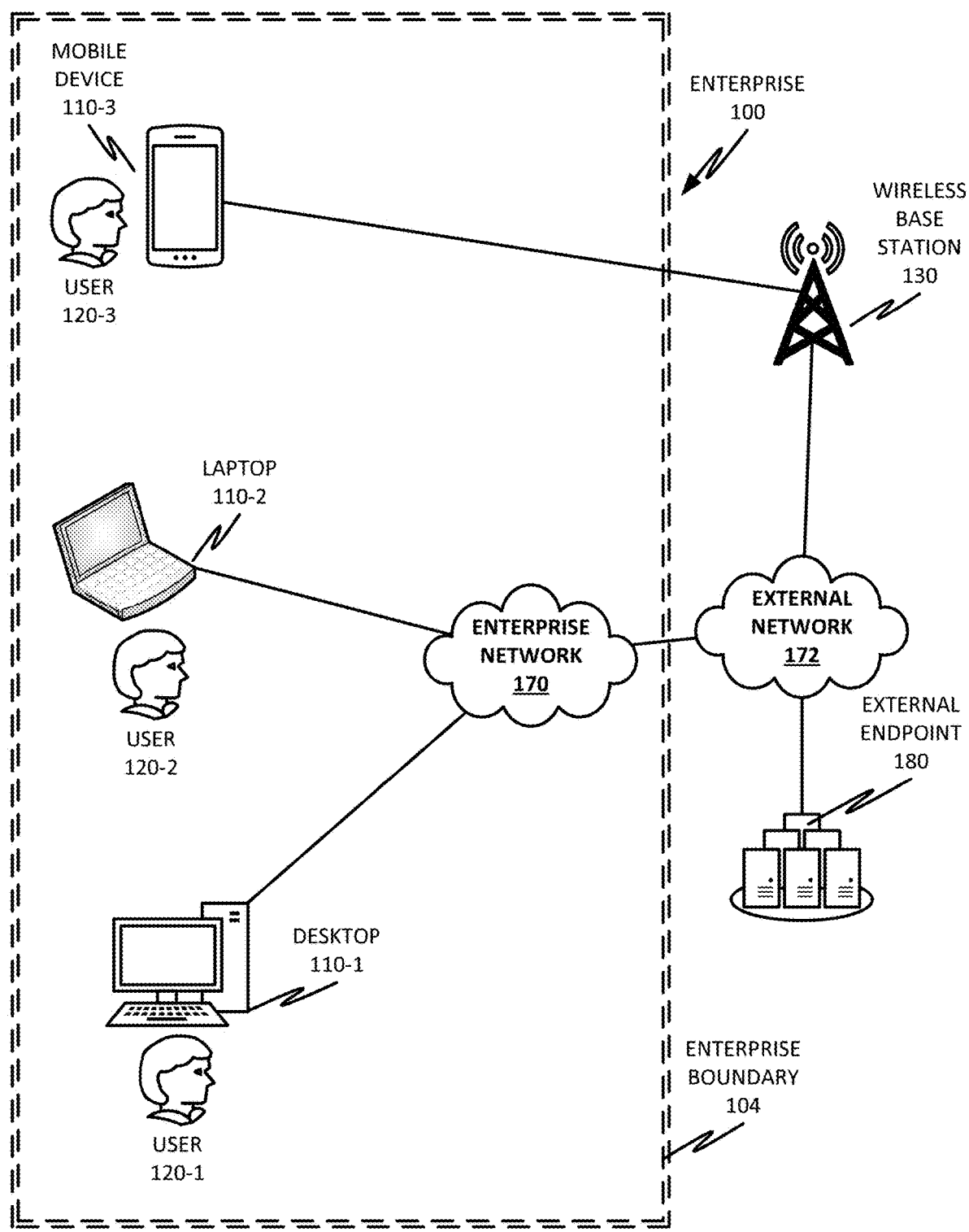
FIGS. 1A and 1B are block diagram of a network architecture according to one or more examples of the present specification.

In an example, there is disclosed a network switch or other computing apparatus comprising: an ingress interface; a plurality of egress interfaces; and one or more logic elements, including at least a content addressable memory (CAM), comprising a channel selection engine to provide persistent channel selection comprising: receive a packet on the ingress interface; inspect a layer 2 (L2) attribute of the packet; lookup the L2 attribute in the CAM; and assign the packet to an egress interface communicatively coupled to a network service.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Furthermore, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Port channel link selection is driven by a hardware-based "result bundle hash" (RBH). By way of example, a network switch may include an application-specific integrated circuit (ASIC) for hashing incoming traffic on an ingress port and assigning it to one of a plurality of egress ports. The hash may be calculated by some combination of values like SRC-IP (source IP address) and DEST-IP (destination IP address). However, the hash is not deterministic across different line cards, as the line cards may have different hashing capabilities or algorithms. Non-deterministic hashing can lead to inconsistent port assignments, which can lead to deployment difficulties. It is therefore advantageous to provide a deterministic hashing capability whose result will persist across different line cards. The hash in Port Channel is also not reversible, meaning that when traffic returns to the switch, the switch cannot determine whether it is returning on the same port that it went out on. This can have security implications, and can also lead to dropped packets, for example when a node goes down and its traffic "bucket" needs to be assigned to a different node.

This specification provides a system, method, and architecture for providing a "Smart Channel," which is an intelligent improvement on the existing Port Channel architecture. In Smart Channel, rather than a hashing algorithm, certain attributes are keyed to a traffic bucket in a tertiary content-addressable memory (TCAM) or other content addressable memory (CAM). The keyed attribute may be any attribute of the packet, including by way of nonlimiting example SRC-IP, DEST-IP, SRC-PORT, DEST-PORT, network address translation (NAT) assignment, or any other value that varies sufficiently between packets to make meaningful bucket assignments. Because the TCAM is very fast, the lookup does not become a bottleneck, and the table can be maintained consistently across line cards. Assignments are also reversible by performing a reverse lookup in the TCAM. Finally, Smart Channel is more configurable than hardware-based hashing, because it is not tied to specific hardware characteristics. Thus, Smart Channel may be used to craft specific rules, such as ensuring that traffic from a particular source always gets directed to a particular egress port.

Layer 2 (L2) switch channeling provides some or all of the advantages of port channels or EtherChannel, along with additional flexibility. It should be noted that L2 is used as an illustrative, non-limiting example of the system and methods disclosed herein, and may refer to L2 of the OSI stack, the TCP/IP stack, or any other suitable protocol stack or protocol suite. The methods may be adapted, where appropriate, to other layers within the network stack or other protocols.

In an example, Port Channel link selection is driven by a hardware-based RBH. This hash is calculated by a combination of values like SRC-IP and DEST-IP. However this hash is not deterministic across line cards, as different line cards have different hashing capabilities and/or algorithms.

In an example of L2 switch channeling, a network switch, such as a Cisco® Nexus-series switch or equivalent, may be provided with a TCAM or other CAM. Unlike random access memory (RAM), in which the memory retrieves and returns the content stored at a supplied address, a CAM receives a "key," which may be a value in a table, and returns zero or more matches. If the key is found, the CAM returns the address(es) of the "hit," and may also return a value associated with the "hit." This provides a hardware equivalent of an "associative array." A TCAM is a special case of a CAM in which one or more bits may have a "don't care" value, wherein for example 101X matches both 1011 and 1010. A TCAM is used herein by way of concrete example, but embodiments of the present disclosure may also be used with a non-tertiary CAM. Advantageously, TCAMs can be very fast, operating at hardware-like or near-hardware speeds, thus allowing a switch to operate at or near its full available hardware speed while looking up values in a TCAM.

In an embodiment, a switch may be configured to perform L2 channeling, using for example a TCAM to provide a load balancing algorithm. In this case, a network may be arranged to provide one or more service functions that are to be performed before traffic can be forwarded to a workload server providing a customer or end user-facing function.

To provide just one nonlimiting example, an enterprise may provide a web server, which serves a dynamic web page to end users. However, before traffic is provided to the workload cluster providing the actual website, traffic should be cleared through a firewall. Because the volume of traffic is large, having only a single firewall appliance may create an unacceptable bottleneck. Thus, the network switch may require an ability to perform load balancing-like operation for the service function.

Certain embodiments of port channel and EtherChannel or similar may provide a load balancing-like operation. However, in some embodiments, the logic for providing the operations may be provided directly in hardware. Although this may realize speed advantages, this approach may lack the flexibility and consistency required by some applications. Conversely, load balancing in software may be flexible and consistent, but may rely on higher-level layers of the stack (such as L3 and above, where an IP address and/or protocol may be available). These software-based algorithms may not realize the speed necessary to avoid the network switch becoming a bottleneck.

Advantageously, the system, apparatus, and methods of the present specification provide L2 channel selection that provides software-like flexibility and hardware-like speed.

In one example, a port table may be provided in a TCAM, so that hardware-like speeds can be realized. However, because the TCAM is programmable, software-like flexibility can be realized in programming the channeling rules. One substantial advantage of L2 channel selection is that it is deterministic and flexible. Thus, it can be known in advance that a packet with particular properties will always be routed to a particular interface, assuming that interface is still up and active.

L2 channel selection includes, by way of example, the following features:
    a. Using TCAM to drive channel member link selection out of bundle of links
    b. TCAM can be applied on a VLAN, which is a trunk or access member of the bundle of links
    c. Traffic can be matched on any of the following, or a combination thereof:
        i. source subnet
        ii. source port
        iii. destination port
        iv. destination subnets
        v. source mask
        vi. destination mask
    d. Member Ports may be selected by creating redirect rules in the TCAM, for example:
        i. A redirect entry that redirects to a destination index (DI) that identifies a port
        ii. A redirect entry that redirects to DI that identifies a collection of ports
        iii. Multiple redirect entries out of which some may be active and some may be standby, which take over if active fails
    e. The Match/Action policy may be applied to either or combination of following
        i. Entire VLAN
        ii. Ingress of VLAN
        iii. Egress of VLAN
        iv. Ingress of physical port or sub interface
        v. Egress of physical port or sub interface Embodiments of this system and method may be included in Cisco® Smart Channel technology. Embodiments provide, by way of non-limiting examples:
    a. Link aggregation
    b. The ability to create a cluster of transparent mode appliances
    c. Hardware based traffic steering
    d. Transparent insertion of appliances
    e. Wire-speed performance
    f. Backward-compatibility with many ASIC-based systems
    g. Selective traffic splitting
    h. No separate service module or appliance needed
    i. Consistent "hashing"

Advantages of the L2 channeling of the present specification include:
    a. Resiliency (flows are not re-hashed when nodes are added or removed)
    b. IP-stickiness
    c. Provides same functionality as "consistent hashing," even if hardware does not support consistent hashing
    d. Weighted load-splitting
    e. N+M redundancy (N active, M standby)
    f. Health monitoring
    g. A system administrator can select the traffic to be redirected
    h. Preserves L2 properties of port-channel, such as L2 learning and reverse path forwarding (RPF) check i. No need for additional packet headers or fields
j. No need for new control protocols
k. Clients and Servers do not have to be directly connected to switch
l. Supports Cisco® NX-API (HTTPS access to Nexus command-line interface (CLI))
m. Complete transparency to the end devices
n. Reduced capital expenditure with wiring, power, rack space, and cost savings
o. Not dependent on a specific hardware architecture
p. Automated failure handling is possible
q. Simplified provisioning and ease of deployment
r. No arbitrary limit on the number of flows
s. Flow coherent symmetric traffic distribution
   i. Flow coherency for bidirectional flows.
   ii. Same device receives the forward and reverse traffic There is also disclosed a method for configuring L2 channel selection, and an associated application programming interface (API). This provides, by way of nonlimiting example:

a. A port-group command
b. Creation and deletion commands
c. VLAN commands
d. Destination and source filter commands
e. Outputs of a show command
f. API/CLI mechanisms.

The following tables illustrate the resilient node assignment that is available with embodiments of L2 channeling. In the first place, traffic is assigned to one of 16 traffic "buckets" based on an L2 attribute, as discussed herein. Note that where assignment to a bucket includes a lookup in a TCAM, the assignment is both predictable and reversible. To provide just one illustrative and nonlimiting example, the traffic bucket could be keyed to the last four bits of an IPv4 or IPv6 IP address (source or destination), assuming a sufficiently random distribution of IP addresses. The TCAM also includes a table to lookup which node a bucket is assigned to. The traffic is originally distributed between four service nodes as follows:

TABLE 1

Original Bucket Assignments

| Node   | Bucket | Bucket | Bucket | Bucket |
|--------|--------|--------|--------|--------|
| Node 0 | B0     | B4     | B8     | B12    |
| Node 1 | B1     | B5     | B9     | B13    |
| Node 2 | B2     | B6     | B10    | B14    |
| Node 3 | B3     | B7     | B11    | B15    |

Now assume that Node 2 is lost, either because of a catastrophic failure, or the node was deleted. This could be the result, for example, of reduced traffic demands, so that each node is able to handle more buckets. The buckets previously assigned to Node 2 can be distributed among the remaining nodes.

TABLE 2

Bucket Assignments After Node Loss

| Node   | Bucket | Bucket | Bucket | Bucket | Bucket | Bucket |
|--------|--------|--------|--------|--------|--------|--------|
| Node 0 | B0     | B4     | B8     | B12    | B2     | B14    |
| Node 1 | B1     | B5     | B9     | B13    | B6     |        |
| Node 2 | Failed | Failed | Failed | Failed |        |        |
| Node 3 | B3     | B7     | B11    | B15    | B10    |        |

Conversely, assume that rather than losing Node 2, a new Node 4 is added. For example, the traffic demands may have increased, so that each node is now able to handle fewer traffic buckets. When Node 4 comes online, buckets B12, B13, and B14 may be assigned to that node:

| Node   | Bucket | Bucket | Bucket | Bucket |
|--------|--------|--------|--------|--------|
| Node 0 | B0     | B4     | B8     |        |
| Node 1 | B1     | B5     | B9     |        |
| Node 2 | B2     | B6     | B10    |        |
| Node 3 | B3     | B7     | B11    | B15    |
| Node 4 | B12    | B13    | B14    |        |

Note that this solution scales up to 16 service nodes, where each bucket is assigned to exactly one node, or down to one service node, where all buckets are assigned to one node. If more than 16 nodes are needed, the algorithm could be changed, for example by defining 32 buckets and keying off of the final five bits of the IP address (or any other suitable algorithm).

In certain embodiments, the addition or loss of nodes may be assumed to happen sufficiently slowly that bucket reassignments can be handled predictably and effectively in user-space software. Thus, a system administrator has great flexibility in managing how nodes are used and buckets are assigned, and those assignments are persistent, predictable, and reversible.

A system and method for high speed L2 channel selection will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1A is a network-level diagram of a networked enterprise 100 according to one or more examples of the present Specification. Enterprise 100 may be any suitable enterprise, including a business, agency, nonprofit organization, school, church, family, or personal network, by way of non-limiting example. In the example of FIG. 1A, a plurality of users 120 operate a plurality of endpoints or client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are for illustration only, and are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, along with appropriate software. In this illustration, enterprise network 170 is shown as a single network for simplicity, but in some embodiments, enterprise network 170 may include a more complex structure, such as one or more enterprise intranets connected to the Internet. Enterprise network 170 may also provide access to an external network 172, such as the Internet. External network 172 may similarly be any suitable type of network.

Networked enterprise 100 may encounter a variety of "network objects" on the network. A network object may be any object that operates on, interacts with, or is conveyed via enterprise network 170. In one example, objects may be broadly divided into hardware objects, including any physical device that communicates with or operates via the network, software objects, and other logical objects.

Networked enterprise 100 may communicate across enterprise boundary 104 with external network 172. Enterprise boundary 104 may represent a physical, logical, or other boundary. External network 172 may include, for example, websites, servers, network protocols, and other network-based services. In one example, network objects on external network 172 include a wireless base station 130, an application repository 182, an external endpoint 180, and an attacker 190. It may be a goal for enterprise 100 to provide access to desirable services, such as application repository 182 and external endpoint 180, while excluding malicious objects such as attacker 190.

Wireless base station 130 may provide mobile network services to one or more mobile devices 110, both within and without enterprise boundary 104.

Application repository 160 may represent a Windows or Apple "app store" or update service, a Unix-like repository or ports collection, or other network service providing users 120 the ability to interactively or automatically download and install applications, patches, or other software on client devices 110.

In some cases, networked enterprise 100 may provide policy directives that restrict the types of applications that can be installed from application repository 160. Thus, application repository 160 may include software that is not malware, but that is nevertheless against policy. For example, some enterprises restrict installation of entertainment software like media players and games. Thus, even a secure media player or game may be unsuitable for an enterprise computer. A security administrator may be responsible for distributing a computing policy consistent with such restrictions and enforcing it on client devices 110.

Figure 1B:
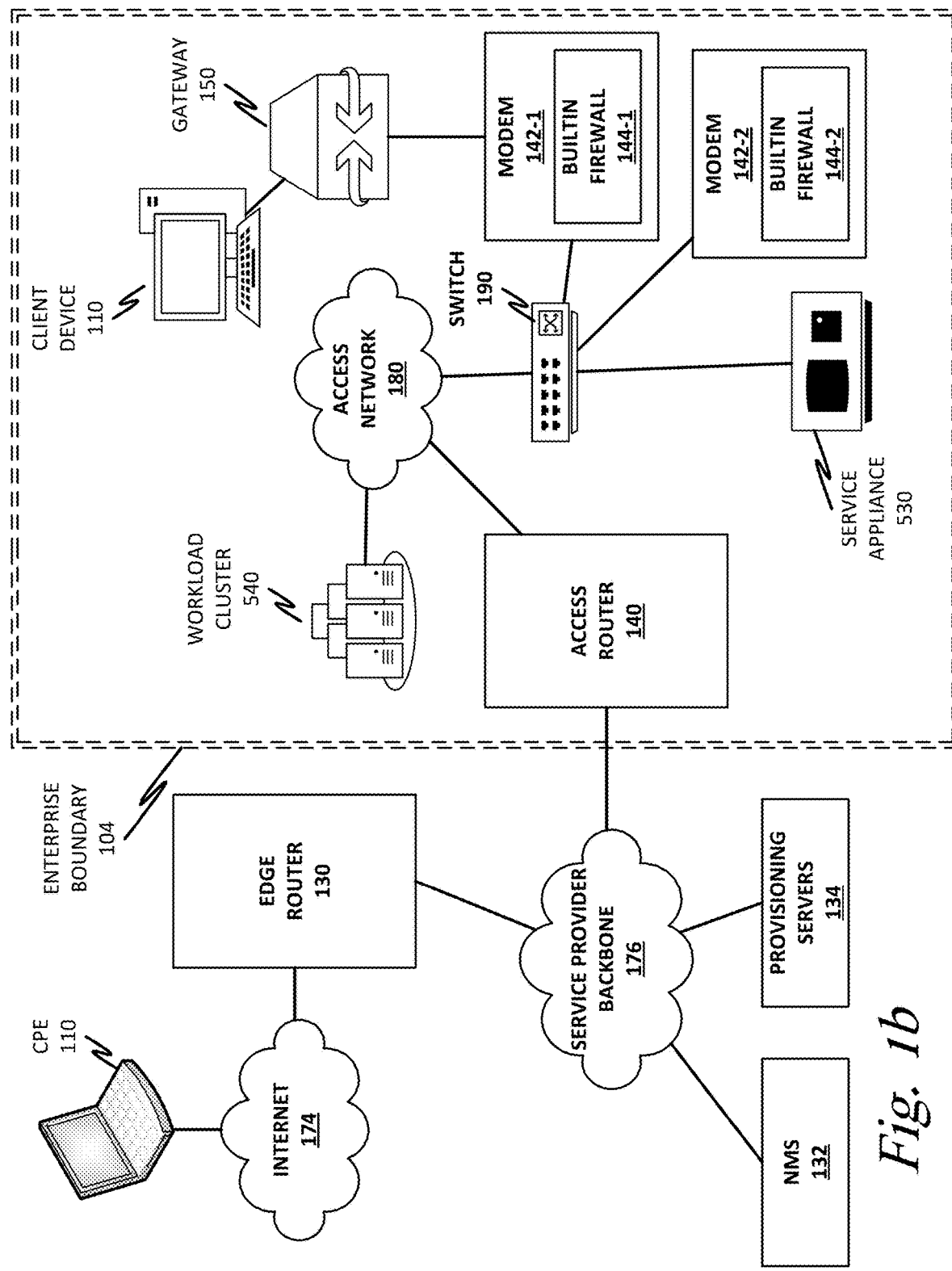

FIG. 1B is a simplified block diagram of a network that may include, for example, enterprise network 170 and external network 172. FIG. 1B includes provisioning servers 134, a network management system (NMS) server 132, an Internet 174, an edge router 130, a service provider backbone 176, an access router 140, an access network 180, a plurality of modems 142-1, 142-2, 142-3, a gateway 150, and customer premises equipment (CPE) such as a client device 110.

In some embodiments, a firewall may be provided in one or more gateways 150, CPE 110, and modems 142, by way of non-limiting example. Those with skill in the art will recognize that although firewalls 144 are shown in each of the foregoing, a firewall need not be included for the devices to function. Firewall 144 may also be, in some embodiments, a separate network device.

In general terms, the network can be configured to communicate with modems 142 to classify traffic. More specifically, access router 140 and modems 142 can use access control lists (ACLs) to identify important data. Note that while in the examples discussed herein, an ACL is used as a way to sort or to classify traffic, other methods may equally be used, such as a data over cable service interfaces specification (DOCSIS) classifier, a telecommunications access method (TCAM), etc.

The following foundational information may be viewed as a basis from which the present disclosure may be properly explained. Such information is offered earnestly for purposes of discussion only and, accordingly, should not be construed in any way to limit the broad scope of the present disclosure. DOCSIS is a telecommunications standard that permits the addition of high-speed data transfer to an existing cable TV (CATV) system. DOCSIS is employed by many cable television operators to provide Internet access over existing hybrid fiber-coaxial (HFC) infrastructure. A DOCSIS architecture generally includes two primary components: a cable modem (CM) located at a customer premises (e.g., more generally represented as modem 142) and a cable modem termination system (CMTS) located at a CATV headend (e.g., more generally represented as access router 140). Cable systems supporting on-demand programming typically use a hybrid fiber-coaxial system. Fiber optic lines bring digital signals to nodes in the system, where they are converted into RF channels and modem signals on coaxial trunk lines.

To identify important data flows, an access router (e.g., access router 140) can be configured with upstream and downstream ACLs. Each ACL may include expressions to match traffic at OSI Layer 2, Layer 3, Layer 4, or any suitable combination thereof. For each modem (e.g., modem 26a-c) in communication with the access router, the access router can monitor the data rate of packets matching ACLs. In an embodiment, each modem can be provisioned with the same or different ACLs that may or may not contain entries from the ACLs in the access router. In another embodiment, each modem may be provisioned with the same ACLs. The ACLs can include packet matching parameters, rate thresholds, time thresholds, timers, etc.

Note that DOCSIS Packet Classifiers are functionally equivalent to ACLs in this context. In an embodiment, when implementing the ACLs, packets such as Address Resolution Protocol (ARP) packets can be identified based on parameters such as the target address. An ARP may be filtered based on parameters within the body of the ARP (e.g., a target hardware address). Other network elements performing network traffic shaping functions may also use the ACLs to identify important traffic.

The access router can be configured to monitor the aggregate data rate used by a cable modem and adjust downstream/upstream channel allocation accordingly. By consolidating traffic on fewer channels, the access router can make a tradeoff between traffic engineering efficiency and modem power consumption. This may be beneficial when the overall network usage is low. Likewise, each modem may request a smaller channel set based on information from a CPE (e.g., CPE 110) or an end user.

Applications running on a CPE can initiate two-way network communications in response to user interaction and autonomously generated events. Network management systems (e.g., provisioning servers 134, NMS server 132, etc.) can initiate two-way network communications to agent processes in the CPE. Two-way communications generally have unicast IP source and destination addresses. Often, network management systems repeatedly transmit certain types of information in structures called data carousels. Data carousels may be addressed to broadcast or multicast destinations. Data carousels usually convey information that is needed by the CPE, but that is unsuitable for storage in the CPE's persistent memory. For instance, if the CPE is a set-top box, system information and program guide information changes occasionally and this information would not be reliable when the set-top box activates after a significant time offline. Carousels deliver data with performance independent of the number of set-top boxes served. In addition, broadcast carousels can remain effective in some situations, where upstream communications are impaired.

Several element management and provisioning protocols may use downstream datagram delivery that terminate at the CPE. Some of these datagrams may be unsolicited by the CPE and do not result in any attempt to respond with an acknowledgement. Examples include conditional access Entitlement Management Messages and MPEG DSM-CC passthrough messages when the CPE is a set-top box.

The modem might need to maintain values in memory including IP addresses, configuration file settings, service identifier (SID) values, downstream service identifier (DSID) values, service agreement identifier (SAID), BPI+ state, etc. The modem can be configured to keep track of elapsed time. In one example, the modem may be free from having to maintain autonomous tracking of elapsed time during a low-power dissipation state, even though some set-top boxes support scheduled events.

In an embodiment, messages from the network to the modem or CPE can be used to communicate policies such as duty cycle, always-be-on time window, whether the downstream receiver should continue to listen for control messages, etc. Policies of direct interest to the access router may be indicated in extensions in REG-REQ, REG-REQ-MP, REG-RSP and REG-RSP-MP DOCSIS MAC Management messages. The modem and the access router can implement these policies only partially and, thus, may need to be discovered or negotiated. In another embodiment, the ranging operations of the modem may be reduced when coming out of a low-power state. For example, the access router may continue to offer station maintenance opportunities so that the modem can go directly to station maintenance and skip initial maintenance.

Turning to the example infrastructure associated with present disclosure, CPE 110 can be associated with devices, customers, or end users wishing to receive data or content in energy management system 10 via some network. The term 'customer premise equipment' is inclusive of devices used to initiate a communication, such as a receiver, a computer, a set-top box, an Internet radio device (IRD), a cell phone, a smart phone, a tablet, a personal digital assistant (PDA), a Google Android, an iPhone, and iPad, or any other device, component, element, or object capable of initiating voice, audio, video, media, or data exchanges. CPE 110 may also be inclusive of a suitable interface to the human user, such as a display, a keyboard, a touchpad, a remote control, or other terminal equipment. CPE 110 may also be any device that seeks to initiate a communication on behalf of another entity or element, such as a program, a database, or any other component, device, element, or object capable of initiating an exchange. Data, as used herein in this document, refers to any type of numeric, voice, video, media, or script data, or any type of source or object code, or any other suitable information in any appropriate format that may be communicated from one point to another.

Service provider backbone 176 and Internet 174 each represent a series of points or nodes of interconnected communication paths for receiving and transmitting packets of information that propagate through networks. Service provider backbone 176 and internet 174 each offer a communicative interface between sources and/or hosts, and may be any appropriate network. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures, and DOCSIS cable television (CATV). The architecture of the present disclosure may include a configuration capable of transmission control protocol/internet protocol (TCP/IP) communications for the transmission and/or reception of packets in a network.

Access router 140 and modem 142 are network elements that can facilitate the networking activities discussed herein. As used herein in this Specification, the term 'network element' is meant to encompass any of the aforementioned elements, as well as switches, cable boxes of any kind (including set-top boxes), CMTSs, CMs, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, access router 140 and/or modem 142 include software to achieve (or to foster) the networking activities discussed herein. Additionally, each of these elements can have an internal structure (e.g., a processor, a memory element, etc.) to facilitate some of the operations described herein. In other embodiments, these networking activities may be executed externally to these elements, or included in some other network element to achieve the intended functionality. Alternatively, access router 140 and/or modem 142 may include software (or reciprocating software) that can coordinate with other network elements in order to achieve the networking activities described herein. In still other embodiments, one or several devices may include any suitable algorithms, hardware, software, components, modules, interfaces, or objects that facilitate the operations thereof.

The enterprise network also includes a service appliance 530 and a workload cluster 540. The Service appliance 530 may provide a network service such as a firewall, deep packet inspection, antivirus scanning, load balancing, or any other suitable service, whether the service modifies incoming packets or simply inspects and passes incoming packets.

Workload cluster 540 may provide client-facing services, such as a website, web services, FTP, NTP, NFS, collaborative document services, or any other suitable service.

In cases where separate load balancing appliances are not provided, switch 190 may be tasked with load balancing traffic out to a plurality of service appliances. This may be accomplished via a method such as EtherPort, PortChannel, or L2 channeling in accordance with the teachings of this specification.

Figure 2:
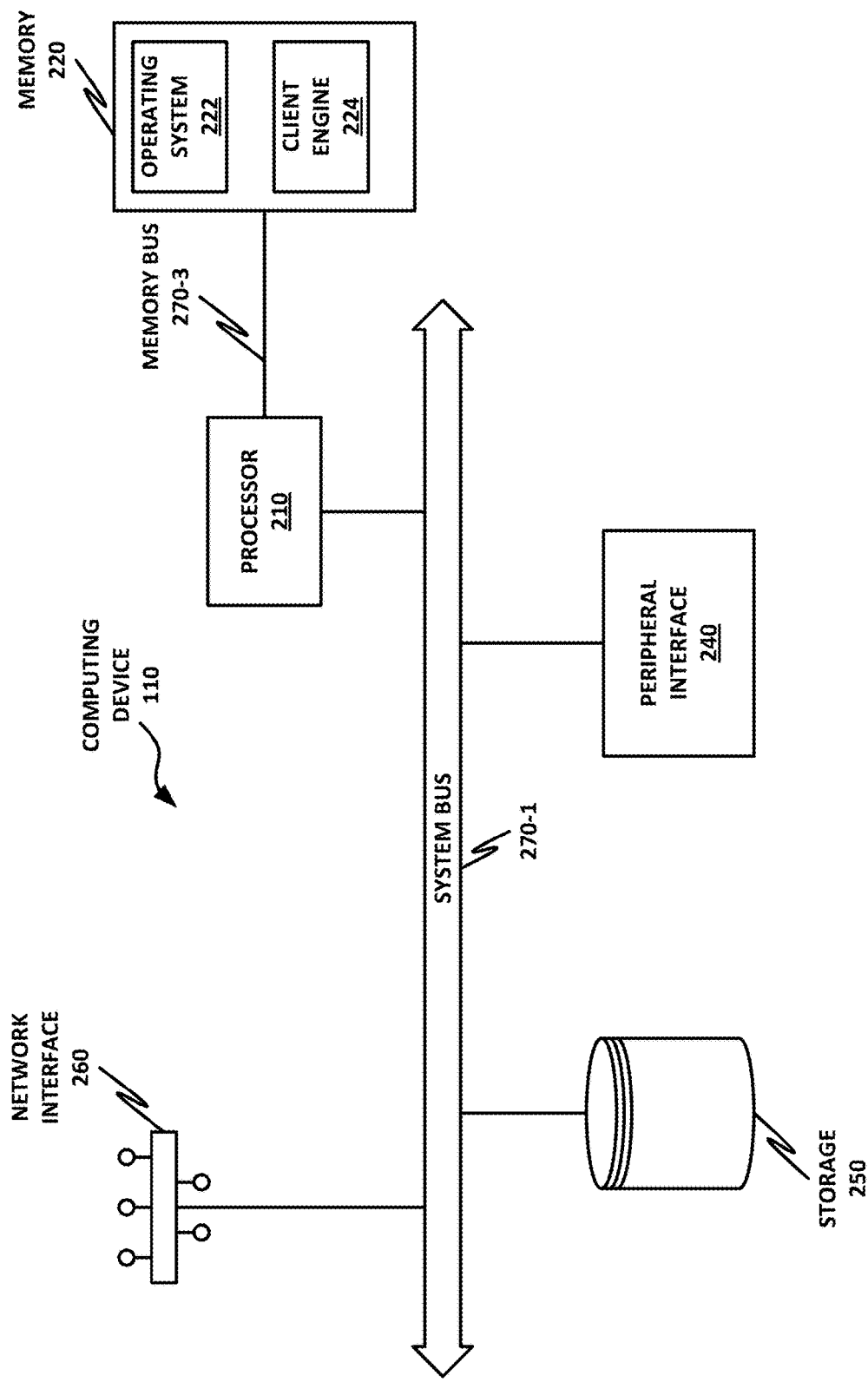
FIG. 2 is a block diagram of a client-class computing device, such as a customer-premises equipment (CPE) or endpoint device, according to one or more examples of the present specification.

FIG. 2 is a block diagram of client device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of computing devices 200.

Computing device 200 includes a processor 210 connected to a memory 220, having stored therein executable instructions for providing an operating system 222 and at least software portions of a client engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus.

Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of client engine 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Client engine 224, in one example, is operable to carry out computer-implemented methods as described in this specification. Client engine 224 may include one or more tangible non-transitory computer-readable mediums having stored thereon executable instructions operable to instruct a processor to provide a client engine 224. As used throughout this specification, an "engine" includes any combination of one or more logic elements, of similar or dissimilar species, operable for and configured to perform one or more methods provided by the engine. Thus, client engine 224 may comprise one or more logic elements configured to provide methods as disclosed in this specification. In some cases, client engine 224 may include a special integrated circuit designed to carry out a method or a part thereof, and may also include software instructions operable to instruct a processor to perform the method. In some cases, client engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that client engine 224 may also include other hardware and software, including configuration files, registry entries, and interactive or user-mode software by way of non-limiting example.

In one example, client engine 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of client engine 224 to provide the desired method.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digial outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
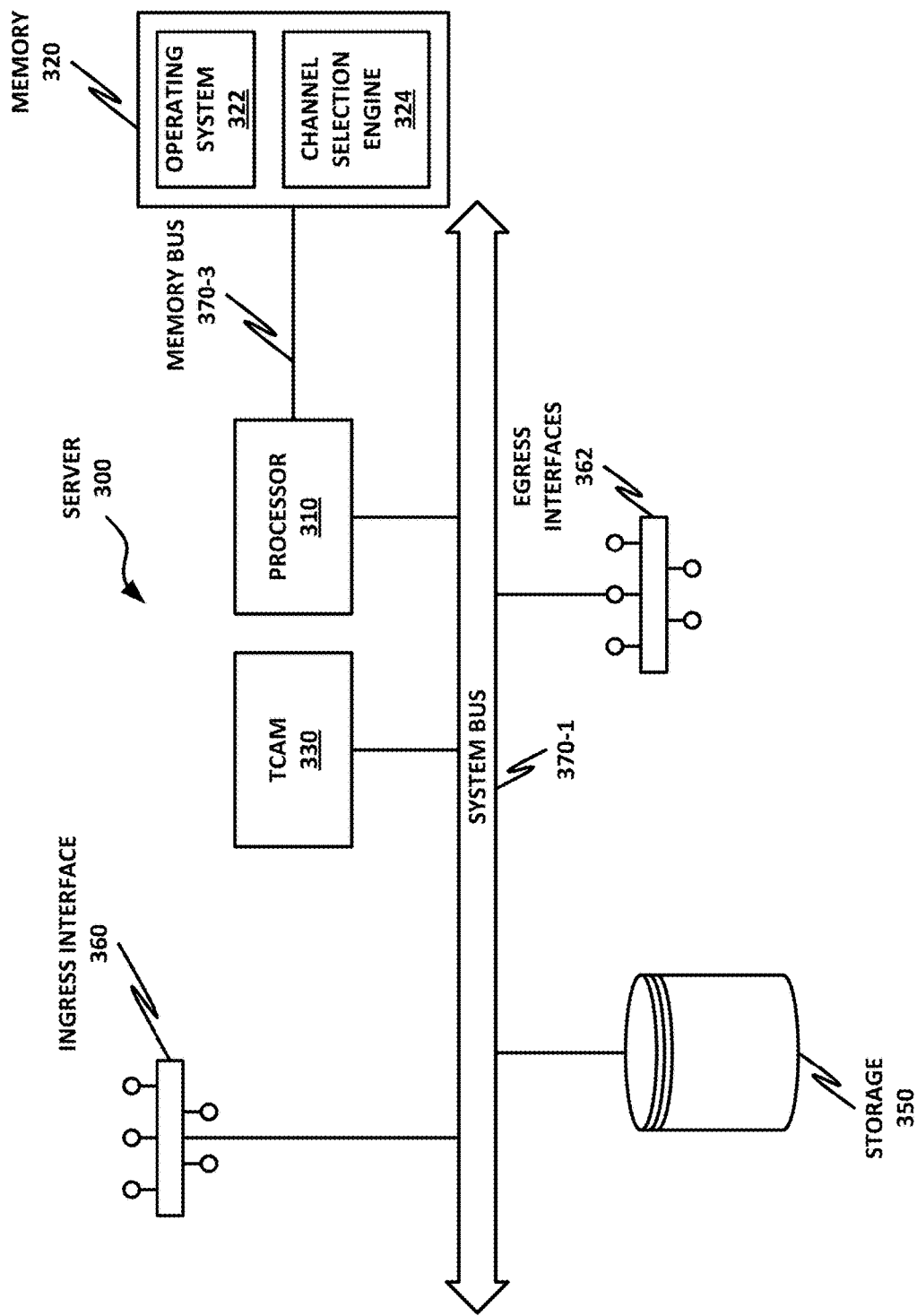
FIG. 3 is a block diagram of a server-class computing device according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

In certain particular embodiments, switch 190 may be an embodiment of a server 300.

Server 300 includes a processor 310 connected to a memory 320, having stored therein executable instructions for providing an operating system 322 and at least software portions of a channel selection engine 324. Other components of server 300 include a storage 350, an ingress interface 360, a plurality of egress interfaces 362, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of channel selection engine 324.

Ingress interface 360 may be provided to communicatively couple server 140 to a wired or wireless network, and may include one or more logic elements as described in FIG. 2. Ingress interface 360 may be disposed to receive incoming traffic, such as from client devices, while egress interfaces 362 may be disposed to send traffic to external devices, such as enterprise clients 110, workload cluster 540, or service appliances 530. As illustrated more fully in FIG. 5, a first cluster of egress interfaces 362 may be dedicated to a cluster of service appliances 530, and a second cluster of egress interfaces 362 may be dedicated to a workload cluster 540.

Channel selection engine 324 is an engine as described in FIG. 2 and, in one example, includes one or more logic elements operable to carry out computer-implemented methods as described in this specification. Software portions of channel selection engine 324 may run as a daemon process.

Channel selection engine 324 may include one or more non-transitory computer-readable mediums having stored thereon executable instructions operable to instruct a processor to provide a security engine. At an appropriate time, such as upon booting server 140 or upon a command from operating system 322 or a user 120 or security administrator 150, processor 310 may retrieve a copy of channel selection engine 324 (or software portions thereof) from storage 350 and load it into memory 320. Processor 310 may then iteratively execute the instructions of channel selection engine 324 to provide the desired method.

Figure 4:
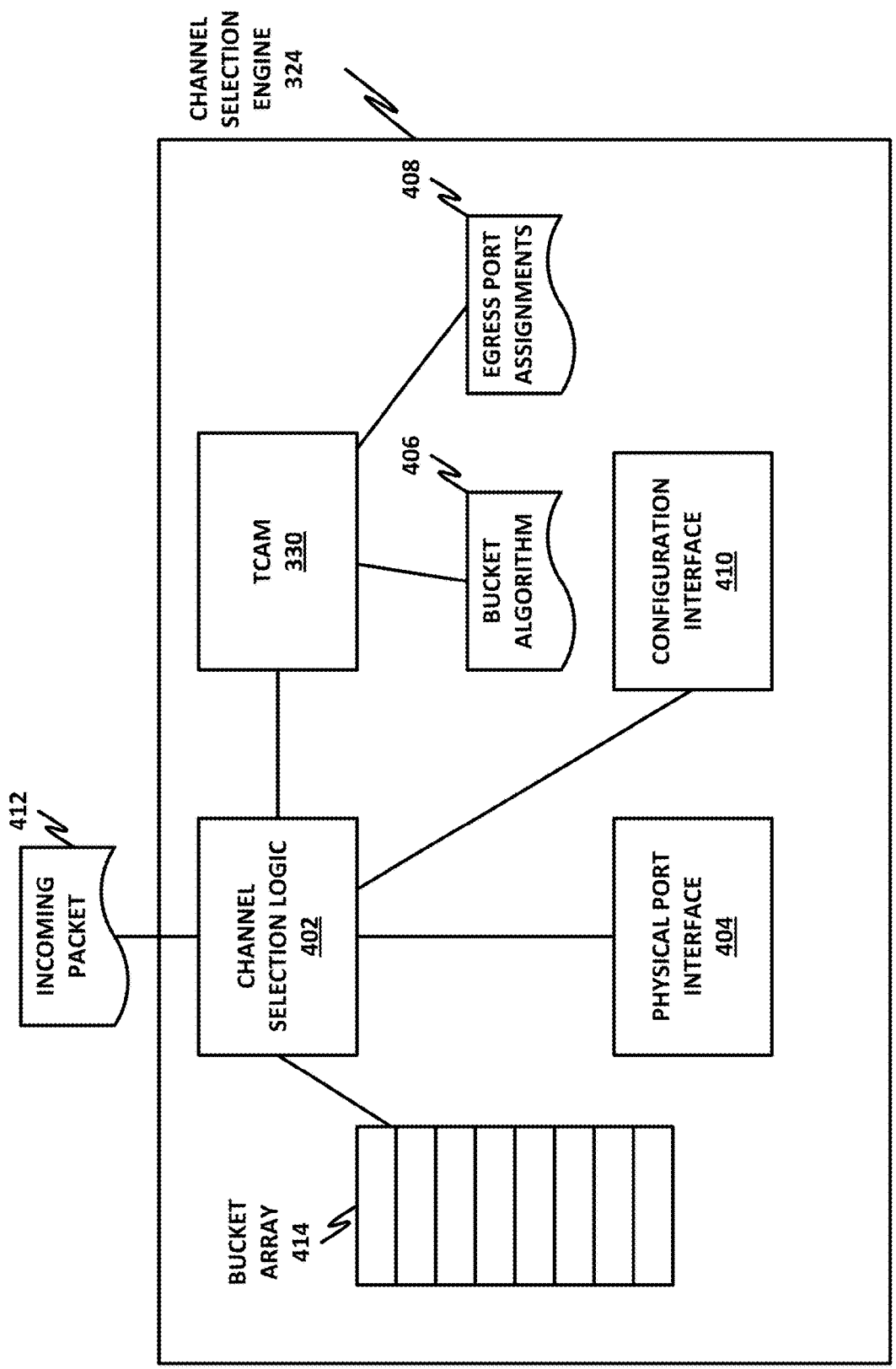
FIG. 4 is a block diagram of a channel selection engine 324 according to one or more examples of the present specification.

FIG. 4 is a block diagram of a channel selection engine 324 according to one or more examples of the present specification. This block diagram provides a non-limiting and illustrative example of a possible configuration for channel selection engine 324. Other configurations are possible, and it should be understood that this configuration is not intended to be limiting or to imply that channel selection engine 324 must comply with a particular physical or logical configuration. Note that the blocks disclosed herein illustrate logical functions rather than necessary divisions or discrete hardware or software units.

In this example, channel selection logic 402 includes one or more logic elements, including at least one hardware logic element, to provide the logic for selecting an egress port for an incoming packet. Channel selection logic 402 may include an ASIC, or may include some combination of a firmware and processor or software and processor, by way of example. In this case, one role of channel selection logic 402 is to inspect an incoming packet 412 at L2, assign the packet to a traffic bucket within bucket array 414, and direct traffic for that bucket to an egress port.

To this end, channel selection logic 402 may extract a key from an attribute, such as an L2 attribute of incoming packet 412, such as selected bits from the source or destination IP address, MAC address, source or destination ports, or any other information that varies between packets sufficiently to act as an assignment key. Channel selection logic 402 queries TCAM 330 with this key, and TCAM 330 provides, for example, a bucket assignment from bucket algorithm 406, which may simply be a table that assigns buckets based on the attribute, or a more complex algorithm as suitable to the embodiment. Channel selection logic 402 then queries TCAM 330 for the proper egress port assignment for the assigned bucket. Again, TCAM 330 may lookup the value in an egress port assignments table 408, and provide the correct egress port back to channel selection logic 402. Channel selection logic 402 can then operate physical port interface 404 to direct incoming packet 412 to the assigned egress port.

Channel selection engine 324 may also include a configuration interface 410, which allows a system administrator to configure bucket assignments and egress port assignments, as well as to view configurations, manage traffic, and view logs. Configuration interface 410 may provide, for example, one or more application programming interfaces (APIs) for separate software to access management functions.

Figure 5A:
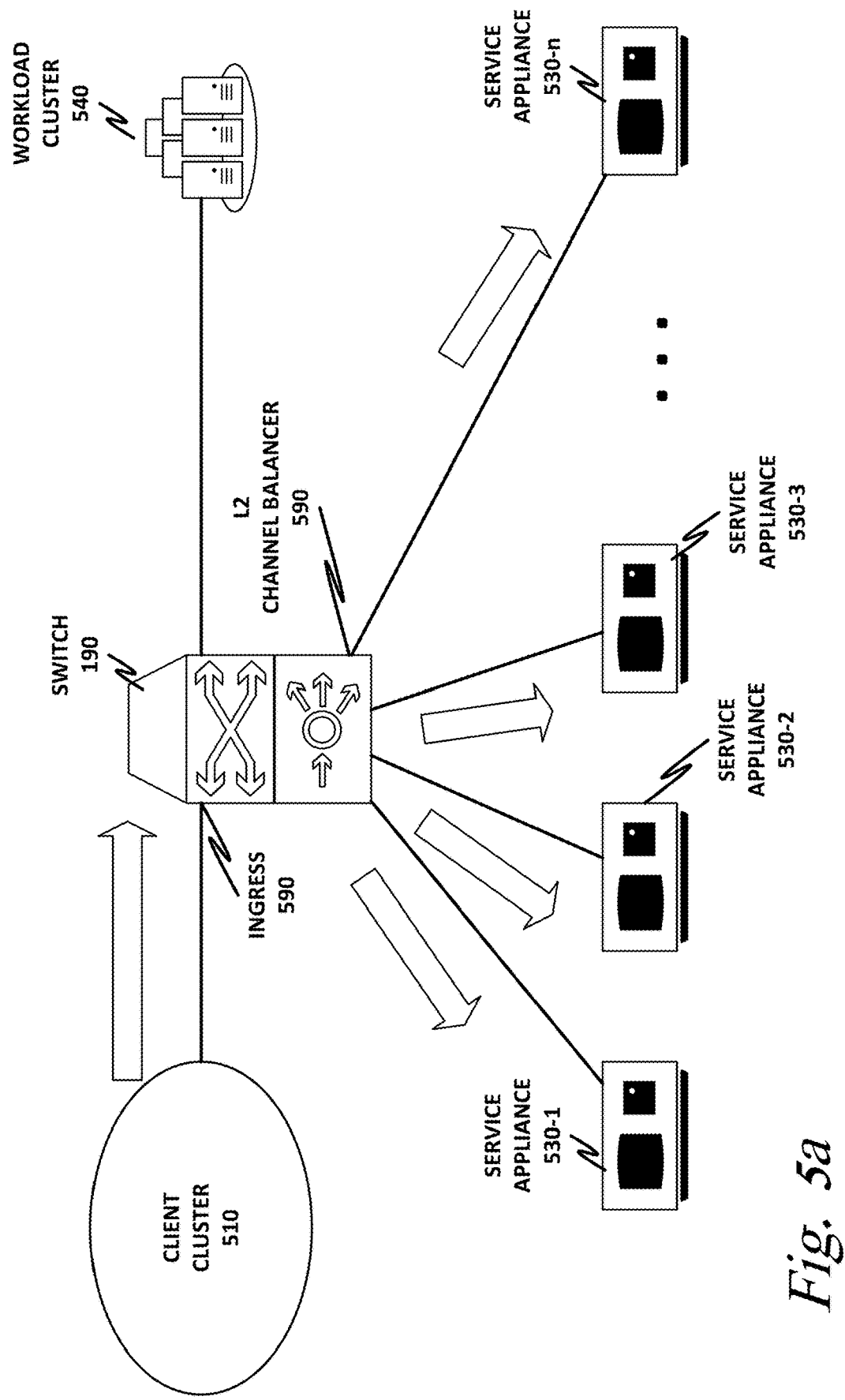
FIG. 5A and 5B are a block diagram illustrating packet flows in an L2 channel selection according to one or more examples of the present specification.

FIG. 5a illustrates an example of traffic distribution according to one or more examples of this specification. In this embodiment, a plurality of client devices 110 comprise a client cluster 510. Client cluster 510 may be highly heterogeneous, and may include any devices that connect to network 170 to communicate with a service provided by enterprise 100. For example, if enterprise 100 provides a website, client cluster 510 may include all of the client devices that connect to network 170 to access the website. Because client cluster 510 may include a large number of clients, the volume of traffic may be more than can reasonably be handled by a single service appliance 530.

Client cluster 510 provides traffic that is switched to a plurality of service appliances 530. Note that service appliances 530 may not be the end destination for incoming packets on ingress interface 590. Rather, these may be intermediate service appliances, such as firewalls, DPI, antivirus scanners, or other intermediate service appliances.

In this case, switch 190 has a number of egress ports, and each service appliance 530 is communicatively coupled to an egress port. Switch 190 receives a network packet on ingress interface 590 via network 170, and operates L2 channel balancer 590, which may include a channel selection engine 324, to direct the incoming packet to one of several service appliances 530. Advantageously, L2 channeling does not require rewriting any MAC or IP addresses on any of the incoming packets. Furthermore, clients and servers may or may not be directly connected.

In this example, n service appliances (530-1–530-n) are provided. For example, consider a case where four nodes are provided, named Node 0-Node 3. Channel selection 324 may include the following node assignment table.

TABLE 3

Original Bucket Assignments

| Node | Bucket | Bucket | Bucket | Bucket |
| --- | --- | --- | --- | --- |
| Node 0 | B0 | B4 | B8 | B12 |
| Node 1 | B1 | B5 | B9 | B13 |
| Node 2 | B2 | B6 | B10 | B14 |
| Node 3 | B3 | B7 | B11 | B15 |

Now assume that Node 2 is lost, either because of a catastrophic failure, or the node was deleted. This could be the result, for example, of reduced traffic demands, so that each node is able to handle more buckets. The buckets previously assigned to Node 2 can be distributed among the remaining nodes.

TABLE 4

Bucket Assignments After Node Loss

| Node | Bucket | Bucket | Bucket | Bucket | Bucket | Bucket |
| --- | --- | --- | --- | --- | --- | --- |
| Node 0 | B0 | B4 | B8 | B12 | B2 | B14 |
| Node 1 | B1 | B5 | B9 | B13 | B6 | |
| Node 2 | Failed | Failed | Failed | Failed | | |
| Node 3 | B3 | B7 | B11 | B15 | B10 | |

Conversely, assume that rather than losing Node 2, a new Node 4 is added. For example, the traffic demands may have increased, so that each node is now able to handle fewer traffic buckets. When Node 4 comes online, buckets B12, B13, and B14 may be assigned to that node:

| Node   | Bucket | Bucket | Bucket | Bucket |
|--------|--------|--------|--------|--------|
| Node 0 | B0     | B4     | B8     |        |
| Node 1 | B1     | B5     | B9     |        |
| Node 2 | B2     | B6     | B10    |        |
| Node 3 | B3     | B7     | B11    | B15    |
| Node 4 | B12    | B13    | B14    |        |

Note that this solution scales up to 16 service nodes, where each bucket is assigned to exactly one node, or down to one service node, where all buckets are assigned to one node. If more than 16 nodes are needed, the algorithm could be changed, for example by defining 32 buckets and keying off of the final five bits of the IP address (or any other suitable algorithm).

Figure 5B:
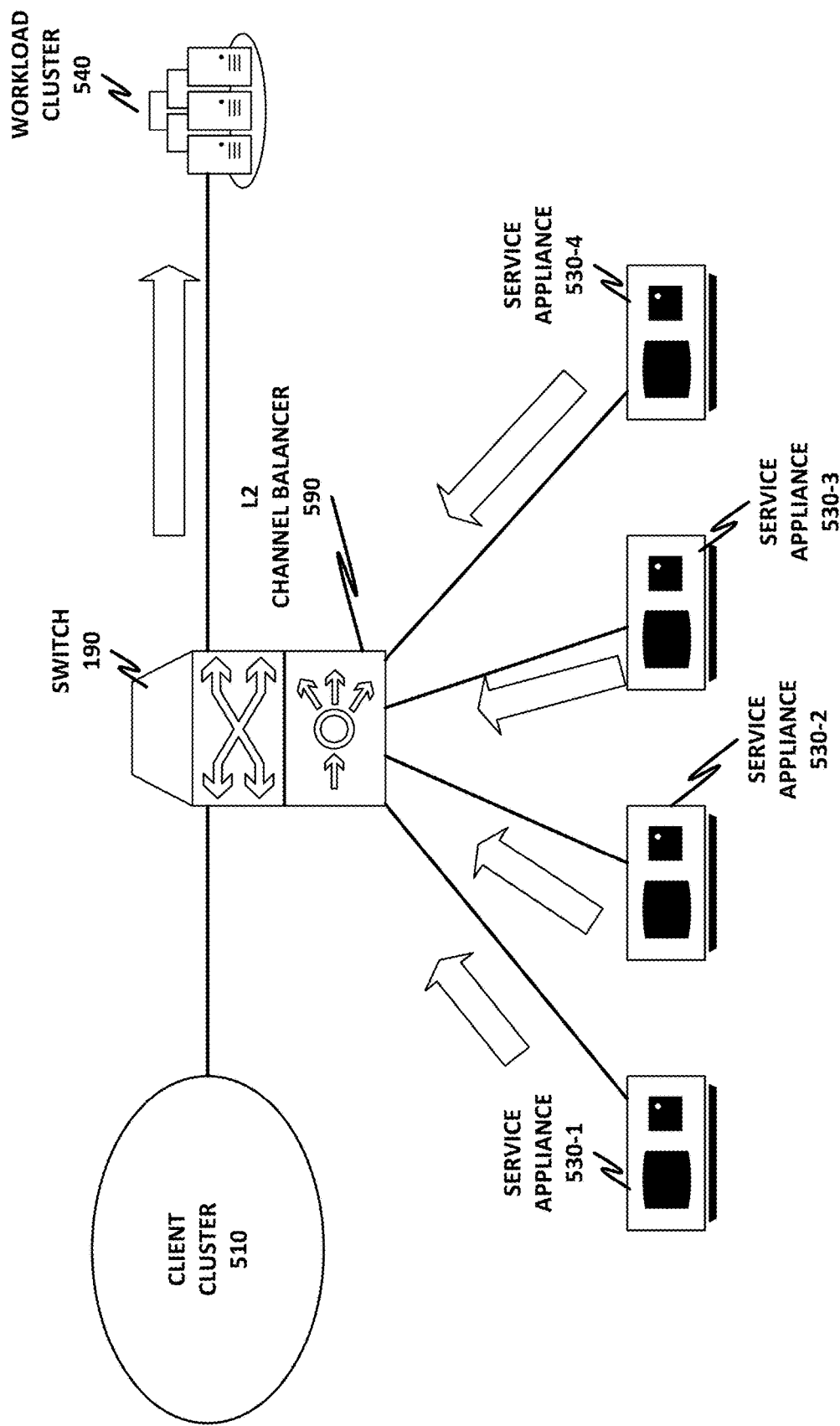

As seen in FIG. 5b, once service appliances 530 have processed the packets, they return the packets to switch 190, which then passes the packets to workload cluster 540.

Figure 6:
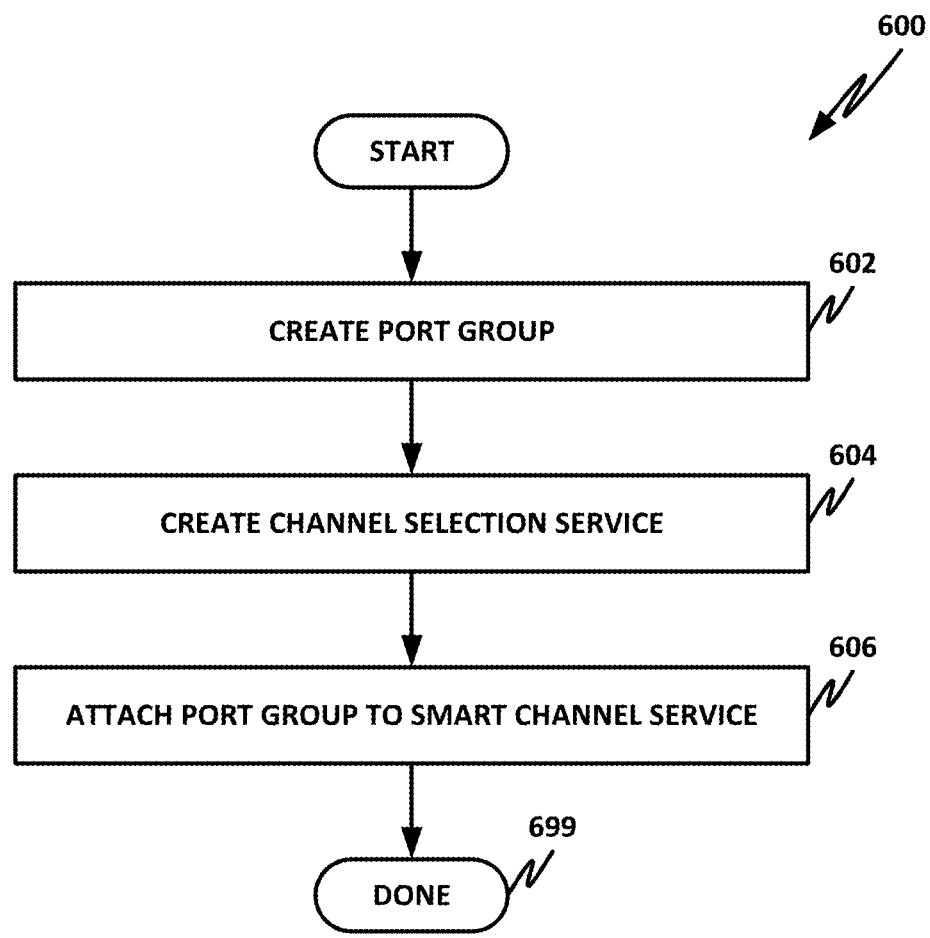
FIG. 6 is a flow chart of configuring L2 channel selection according to one or more examples of the present specification.

FIG. 6 is a flow chart of a method 600 of configuring L2 channel selection on a network switch according to one or more examples of the present specification.

In block 602, a system administrator may issue commands to enable L2 channel selection on the switch. The system administrator may then create a port group, such as a group of egress interfaces that will be subject to L2 channel selection.

In block 604, the system administrator creates the L2 channel selection service. This may include, for example, configuring a service name, specifying an ingress interface for the service, and associating an egress port group (such as the group created in block 604) with the service. It may also include specifying a desired load distribution scheme, or configuring tables with the TCAM.

In block 606, the system administrator attaches the port group to the smart channel service, such as by issuing a command. The L2 channel selection service is now prepared to receive ingress traffic on the specified ingress port, and to direct traffic to egress interfaces in the egress port group according to the values in the TCAM.

Figure 7:
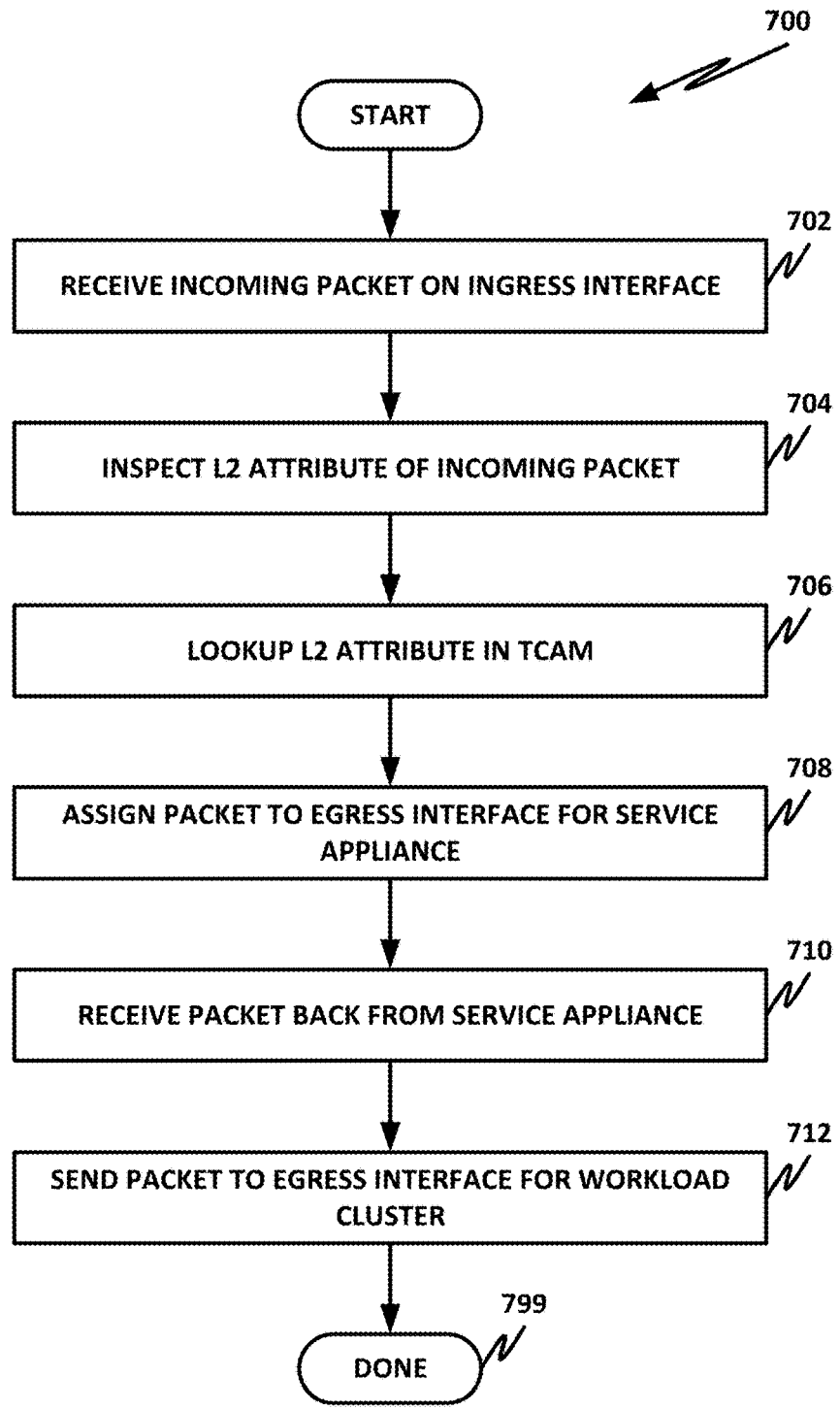
FIG. 7 is a flow chart of L2 channel selection according to one or more examples of the present specification.

FIG. 7 is a flow chart of a method of handling incoming traffic according to one or more examples of the present specification. Method 700 may be performed by a network switch 190 configured with L2 channel selection as described herein.

In block 702, switch 190 receives an incoming packet 412 on ingress interface 490.

In block 704, switch 190 inspects an L2 attribute of incoming packet 412. The attribute may include one or more of, by way of nonlimiting example:
  i. source subnet
  ii. source port
  iii. destination port
  iv. destination subnets
  v. source mask
  vi. destination mask In block 706, switch 190 looks up the attribute in TCAM 330. This may include a single value lookup (e.g., lookup a bucket assignment for the last four bits of the IP address), or may include a more complicated algorithm, such as combining, cross-referencing, or comparing two values, and then using the result as a key into TCAM 330. Once the traffic is assigned to a bucket, switch 190 may also lookup in TCAM 330 (or elsewhere, if appropriate), which egress interface that bucket is assigned to.

In block 708, switch 190 assigns the incoming packet to the selected egress interface, and send the packet out, such as to a service appliance 530.

In block 710, switch 190 receives the packet back from service appliance 530. The packet has now been scanned, conditioned, modified, logged, or otherwise handled by service appliance 530 according to the function of service appliance 530.

In block 712, switch 190 assigns the packet to an egress interface (or port group) assigned to a workload cluster. Note that this may also include separate load balancing.

In block 799, the method is done.

By way of example, there is disclosed a computing apparatus, comprising: an ingress interface; a plurality of egress interfaces; and one or more logic elements, including at least a content addressable memory (CAM), comprising a channel selection engine to provide persistent channel selection comprising: receive a packet on the ingress interface; inspect a layer 2 (L2) attribute of the packet; lookup the L2 attribute in the CAM; and assign the packet to an egress interface communicatively coupled to a network service.

There is further disclosed an example, wherein the channel selection engine is further to designate a plurality of traffic buckets, and to assign the traffic buckets to one or more egress interfaces.

There is further disclosed an example, wherein the L2 attribute is a source IP address.

There is further disclosed an example, wherein the L2 attribute is a destination IP address.

There is further disclosed an example, wherein the L2 attribute is a source port.

There is further disclosed an example, wherein the L2 attribute is a destination port.

There is further disclosed an example, wherein the network switch is further to: receive the packet a second time; and send the packet to an egress interface communicatively coupled to a workload service.

There is further disclosed an example of one or more tangible, non-transitory computer-readable storage mediums having stored thereon executable instructions for providing a channel selection engine to: receive a packet on an ingress interface; inspect a layer 2 (L2) attribute of the packet; lookup the L2 attribute in a content-addressable memory (CAM); and assign the packet to an egress interface communicatively coupled to a network service.

There is further disclosed an example, wherein the channel selection engine is further to designate a plurality of traffic buckets, and to assign the traffic buckets to one or more egress interfaces.

There is further disclosed an example, wherein the L2 attribute is a source IP address.

There is further disclosed an example, wherein the L2 attribute is a destination IP address.

There is further disclosed an example, wherein the L2 attribute is a source port.

There is further disclosed an example, wherein the L2 attribute is a destination port.

There is further disclosed an example, wherein the network switch is further to: receive the packet a second time; and send the packet to an egress interface communicatively coupled to a workload service.

There is further disclosed an example of a method to be implemented on a network switch having a content-addressable memory (CAM), comprising: receiving a packet on an ingress interface; inspecting a layer 2 (L2) attribute of the packet; looking up the L2 attribute in a content-addressable memory (CAM); and assigning the packet to an egress interface communicatively coupled to a network service.

There is further disclosed an example, further comprising designating a plurality of traffic buckets, and assigning the traffic buckets to one or more egress interfaces.

There is further disclosed an example, wherein the L2 attribute is a source IP address.

There is further disclosed an example, wherein the L2 attribute is a destination IP address.

There is further disclosed an example, wherein the L2 attribute is a source port.

There is further disclosed an example, wherein the L2 attribute is a destination port.

There is further disclosed an example, further comprising: receiving the packet a second time; and sending the packet to an egress interface communicatively coupled to a workload service.

There is further disclosed an example of a method comprising performing any or all of the operations of a channel selection engine disclosed herein.

There is further disclosed an example of an apparatus comprising means for providing the channel selection engine.

There is further disclosed an example wherein the means comprise a processor and a memory.

There is further disclosed an example, wherein the apparatus is a network switch.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

What is claimed is:

1. A computing apparatus, comprising:
   an ingress interface;
   a plurality of egress interfaces;
   and one or more logic elements, including at least a content addressable memory (CAM), a channel selection engine to provide persistent channel selection operations comprising:
   maintain, in the CAM, $2^n$ buckets, each of the buckets being keyed to the last n bits of an Internet Protocol (IP) address, where n is a positive integer smaller than the number of bits of the IP address;
   receive a packet on the ingress interface;
   inspect an layer 2 (L2) attribute of the packet, the attribute being at least one of a source subnet, a source port, a destination port, destination subnets, a source mask, or a destination mask;
   using, without hashing, the L2 attribute to lookup a bucket in the CAM corresponding to the packet;
   and assign, based on the bucket identified by the lookup, the packet to an egress interface communicatively coupled to a network service.

2. The computing apparatus of claim 1, wherein the L2 attribute is a source port.

3. The computing apparatus of claim 1, wherein the L2 attribute is a destination port.

4. The computing apparatus of claim 1, wherein the operations further comprise: receive the packet a second time; and send the packet to an egress interface communicatively coupled to a workload service.

5. The apparatus of claim 1, wherein n is 4.

6. The apparatus of claim 1, wherein n is 5.

7. The apparatus of claim 1, the operations further comprising: assign each of the buckets to one or more egress interfaces; and the assign the packet comprising assign one of the one or more egress interfaces corresponding to the bucket identified by the lookup.

8. One or more tangible, non-transitory computer-readable storage mediums having stored thereon executable instructions that when executed by a processor cause the processor to perform operations comprising:
   maintain, in a CAM, $2^n$ buckets, each of the buckets being keyed to the last n bits of an Internet Protocol (IP) address, where n is a positive integer smaller than the number of bits of the IP address;
   receive a packet on an ingress interface;
   inspect an layer 2 (L2) attribute of the packet, the attribute being at least one of a source subnet, a source port, a destination port, destination subnets, a source mask, or a destination mask;
   using, without hashing, the L2 attribute to lookup a bucket in the CAM corresponding to the packet;
   and assign, based on the bucket identified by the lookup, the packet to an egress interface communicatively coupled to a network service.

9. The one or more tangible, non-transitory computer-readable mediums of claim 8, wherein the L2 attribute is a source port.

10. The one or more tangible, non-transitory computer-readable mediums of claim 8, wherein the L2 attribute is a destination port.

11. The one or more tangible, non-transitory computer-readable mediums of claim 8, wherein the operations further comprise: receive the packet a second time; and send the packet to an egress interface communicatively coupled to a workload service.

12. The mediums of claim 8, wherein n is 4.

13. The mediums of claim 8, wherein n is 5.

14. The mediums of claim 8, the operations further comprising: assign each of the buckets to one or more egress interfaces; and the assign the packet comprising assign one of the one or more egress interfaces corresponding to the bucket identified by the lookup.

15. A method to be implemented on a network switch having a content-addressable memory (CAM), comprising:
maintaining, in the CAM, $2^n$ buckets, each of the buckets being keyed to the last n bits of an Internet Protocol (IP) address, where n is a positive integer smaller than the number of bits of the IP address;
receiving a packet on an ingress interface;
inspecting an layer 2 (L2) attribute of the packet, the attribute being at least one of a source subnet, a source port, a destination port, destination subnets, a source mask, or a destination mask;
using, without hashing, the L2 attribute to lookup a bucket in the CAM corresponding to the packet; and
assigning, based on the bucket identified by the lookup, the packet to an egress interface communicatively coupled to a network service.

16. The method of claim 15, wherein the L2 attribute is a source port.

17. The method of claim 15, wherein the L2 attribute is a destination port.

18. The method of claim 15, further comprising: receiving the packet a second time; and sending the packet to an egress interface communicatively coupled to a workload service.

19. The method of claim 15, wherein n is 4.

20. The method of claim 15, wherein n is 5.

21. The method of claim 15, the operations further comprising: assigning each of the buckets to one or more egress interfaces; and the assigning the packet comprising assign one of the one or more egress interfaces corresponding to the bucket identified by the lookup.

* * * * *